United States Patent [19]

Reichert

[11] Patent Number: 5,654,827
[45] Date of Patent: Aug. 5, 1997

[54] OPTICAL SYSTEM

[75] Inventor: Abraham Reichert, Rehovot, Israel

[73] Assignee: Elop Electrooptics Industries Ltd., Rehovot, Israel

[21] Appl. No.: 500,281

[22] Filed: Jul. 10, 1995

Related U.S. Application Data

[63] Continuation-in-part of Ser. No. 124,614, Sep. 21, 1993, abandoned.

[30] Foreign Application Priority Data

Nov. 26, 1992 [IL] Israel .................................. 103900

[51] Int. Cl.⁶ .................................................. G02B 27/12
[52] U.S. Cl. ............................................. 359/631; 359/640
[58] Field of Search ..................................... 359/631, 640

[56] References Cited

U.S. PATENT DOCUMENTS 3,680,946  8/1972  Bellows ................................. 359/631
5,050,962  9/1991  Monnier et al. .
5,459,612  10/1995  Ingleton ............................... 359/640
5,506,728  4/1996  Edwards et al. ...................... 359/631

*Primary Examiner*—Georgia Y. Epps
*Assistant Examiner*—Thomas Robbins
*Attorney, Agent, or Firm*—Keck, Mahin & Cate

[57] ABSTRACT

An optical system for viewing data, possibly superpositioned on the view of scenery. The optical system consists of a lens divided into two parts by a beam splitter, and it has a surface facing the viewer and a second surface which is convex and defines a mirror facing the surface close to the viewer. The thick lens has a truncated surface facing the data source and the beam from the data source is reflected by the beam splitter to the concave surface of the mirror which reflects it to the eye of the viewer. When the data is superpositioned on a direct view of the scenery, the mirror is partially reflecting.

8 Claims, 6 Drawing Sheets

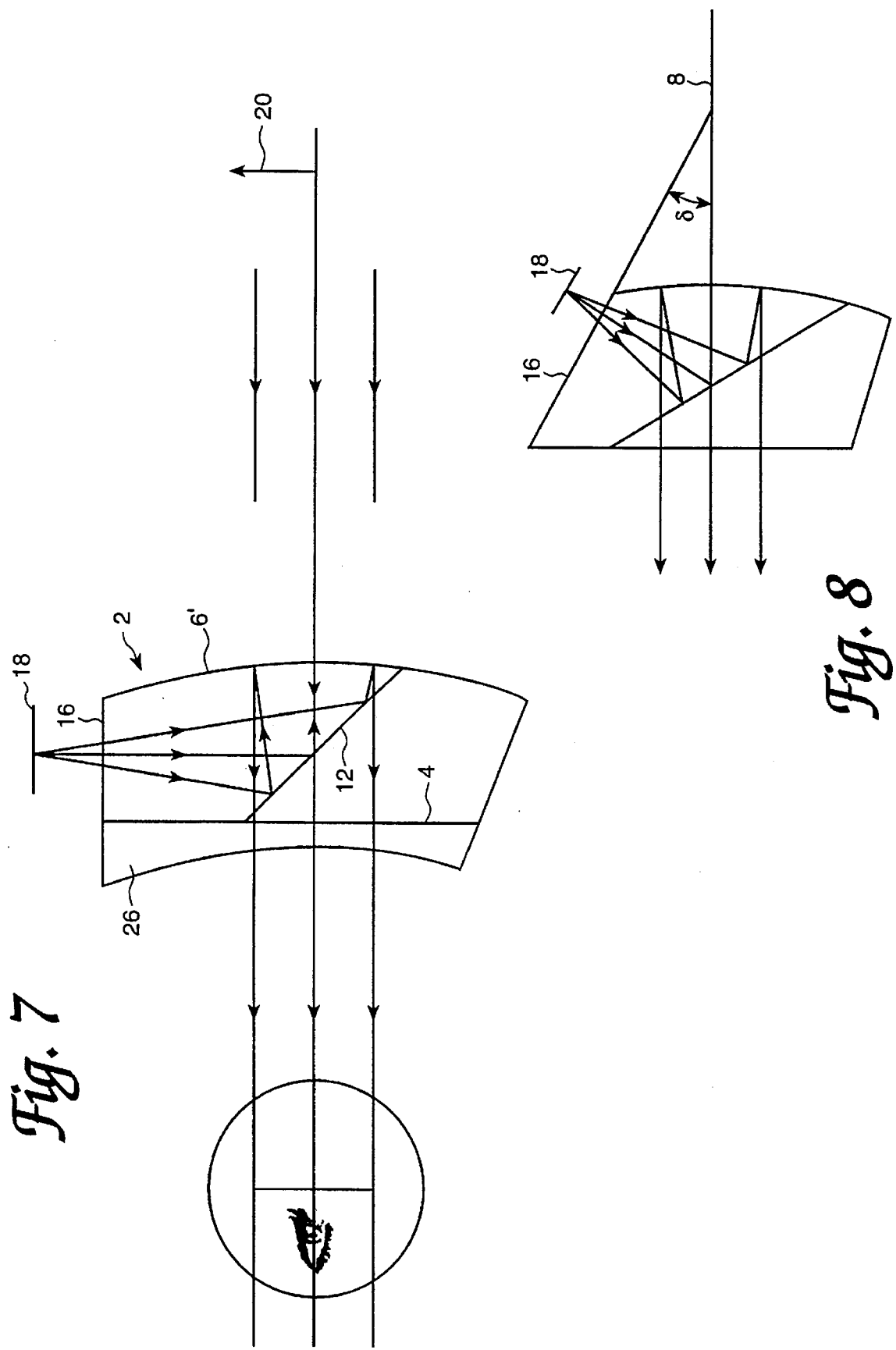

OPTICAL SYSTEM

The present application is a continuation-in-part of U.S. application Ser. No. 08/124,614, filed Sep. 21, 1993 now abandoned.

FIELD OF THE INVENTION

The present invention relates to an integrated optical system for the simultaneous viewing of a first object and an image of a second object superposed on that first object.

Such a system, in which the second object is, e.g., a CRT displaying data and signals from instruments, is of wide applicability. It can, for instance, be used by pilots, to whom the system affords a wide, unencumbered view of the scene while critical parameters, as well as warning signals, are superposed on that view. Other potential users are drivers of, in particular, military vehicles of all kinds who should not take their eyes off the road or terrain to read dashboard instruments. The data supplied by these instruments are superposed by the system on the view of the scene. These systems are generally known as Helmet Mounted Displays (HMDs) and are usually mounted on helmets or other headgear.

BACKGROUND OF THE INVENTION

One such system was disclosed by Monnier et al. in U.S. Pat. No. 5,050,962. The system comprises a collimation and combination optical unit joined to an image generator. It also includes a holographic or dichroid mirror, as well as a semitransparent mirror contained in a transparent plate with parallel faces.

The Monnier HMD, however, suffers from several disadvantages: It requires four optical elements as well as a relay lens to make the data image coincide with the focal plane of one of the four elements which has a concave surface with a semireflective mirror coating. Another serious drawback resides in the fact that Monnier, et al. make use of total internal reflection. Optical surfaces that provide total reflection are highly sensitive and the slightest smudge will drastically reduce the reflective efficiency of these surfaces. Also, the rays from the data generator must undergo three reflections before they reach the viewer's eye, which causes a considerable loss of energy. The use of total internal reflection is responsible for a further, quite serious disadvantage of the Monnier device: because of its necessarily much longer optical path inside the device, the field of view of the Monnier HMD is significantly smaller than that of a system of a comparable display size which does not make use of the additional total internal reflection.

SUMMARY OF THE INVENTION

The objects of the present invention, therefore, are to provide a HMD that consists of a minimum number of components, is both compact and relatively inexpensive, has a wide, unencumbered field of view, and, since it requires a minimum of reflective light passages, is comparatively efficient, energy-wise.

According to the invention, the above objectives are achieved by providing an integrated optical system for the simultaneous viewing of a first object and an image of a second object superposed on said first object, comprising a lens having an optical axis and including a first surface facing a viewer and a second, curved surface facing said first surface and constituting a partially reflecting mirror, said lens being divided into two parts by a planar interface constituting a semi-transparent mirror which slantingly traverses said lens from said first surface towards said second surface; a third surface intersecting said first and second surfaces, produced by truncating said two-part lens, said third surface facing said image produced by said second object, the relative positions between said planar mirror, said second surface, said second object and the optical axis of said lens being such that a light beam originating in said image passes said third surface and is intercepted by said semitransparent mirror, which reflects it onto said second surface that, acting as a collimating mirror, reflects said beam via said first surface towards a viewer in a direction substantially parallel to said optical axis.

The invention will now be described in connection with certain embodiments, by way of example only and with reference to the following illustrative schematic figures, which, it should be noted, are not drawn to scale.

BRIEF DESCRIPTION OF THE DRAWINGS

FIG. 7 shows a zero-power doublet having a negative and a positive component, and FIG. 8 represents an embodiment in which the plane surface facing the data generator includes an acute angle with the optical axis.

DETAILED DESCRIPTION OF THE INVENTION

Figure 1:
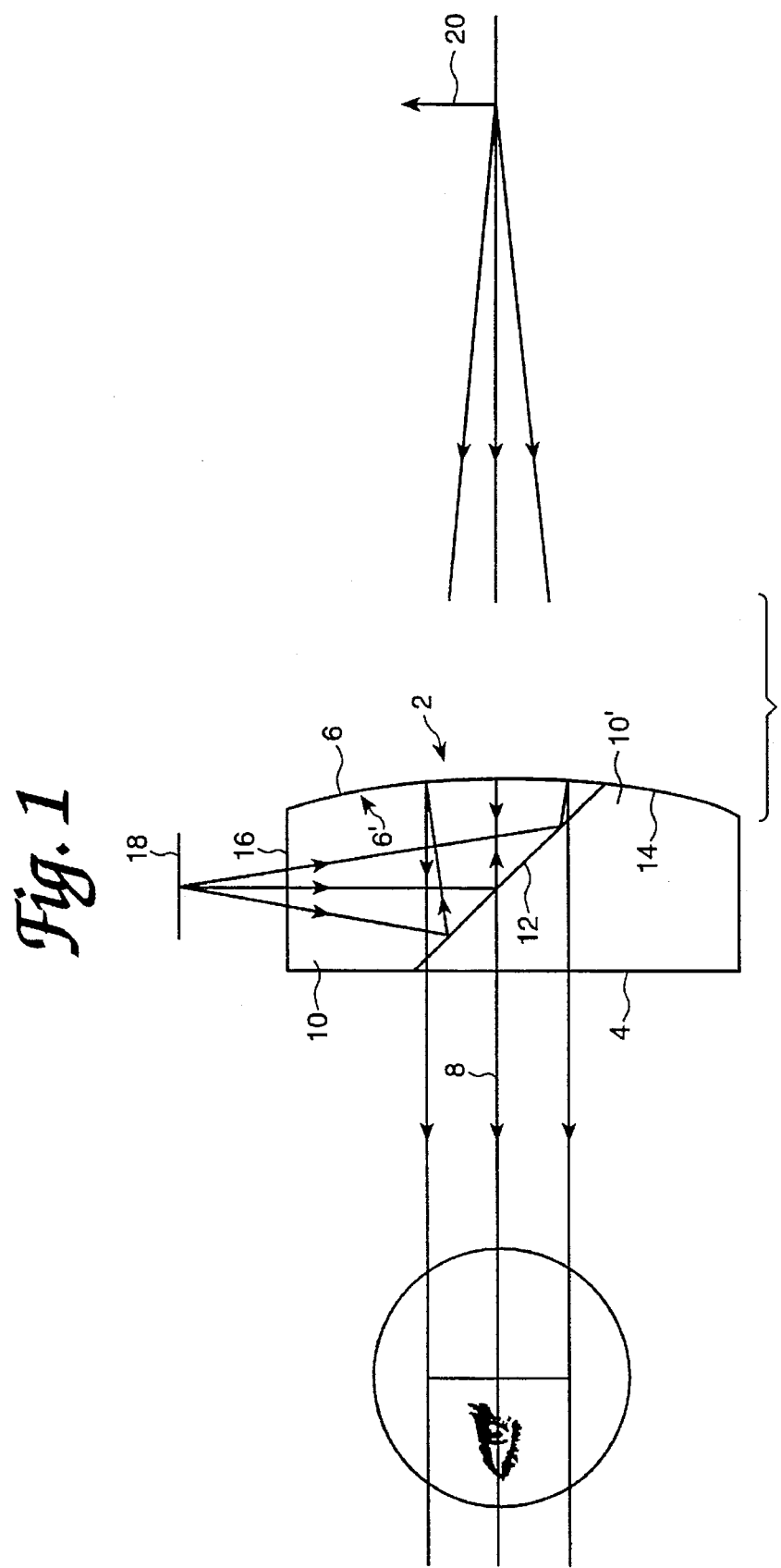
FIG. 1 is a side view of a basic embodiment of the system according to the invention.

As shown in FIG. 1, the optical system of the invention comprises a positive lens 2 having a plane surface 4 and a convex surface 6 perpendicular to the optical axis 8, lens 2 being divided into parts 10 and 10' by a semitransparent mirror 12, which slopes downward from the upper region of surface 4 of lens 2 close to the viewer, to the lower region of surface 6 of lens 2. The convex surface 6 is provided with a dichroic or holographic coating 14, turning it into a semitransparent, concave, spherical mirror 6' which permits passage of part of the light and reflects the other part. By slightly truncating lens 2, there is provided an upper plane surface 16, which is parallel to axis 8. It may, however, also include an acute angle with this axis (see FIG. 8).

The image of the data to be superposed on the image of object 20 is projected from the display surface 18, e.g., the screen of the CRT of a data generator (not shown), which is at the focal distance from mirror 6', via surface 16 to beam splitter 12, and from same to mirror 6', which returns it as a parallel beam in the direction of the eye of the viewer as superposed on the image of object 20. The viewer's eye should be located at the center of curvature of spherical mirror 6'.

As surface 6 is a concave one and surface 4 is a plane one, lens 2 acts, in fact, as a magnifier. This embodiment is particularly useful in industry, where a technician, for instance, inspects a product by making certain electrical contacts and, using an embodiment similar to that shown in FIG. 1, is able to simultaneously perceive data from measuring instruments as superposed on his field of view. Obviously, to be useful at different object distances, per se known focusing means are required.

Figure 2:
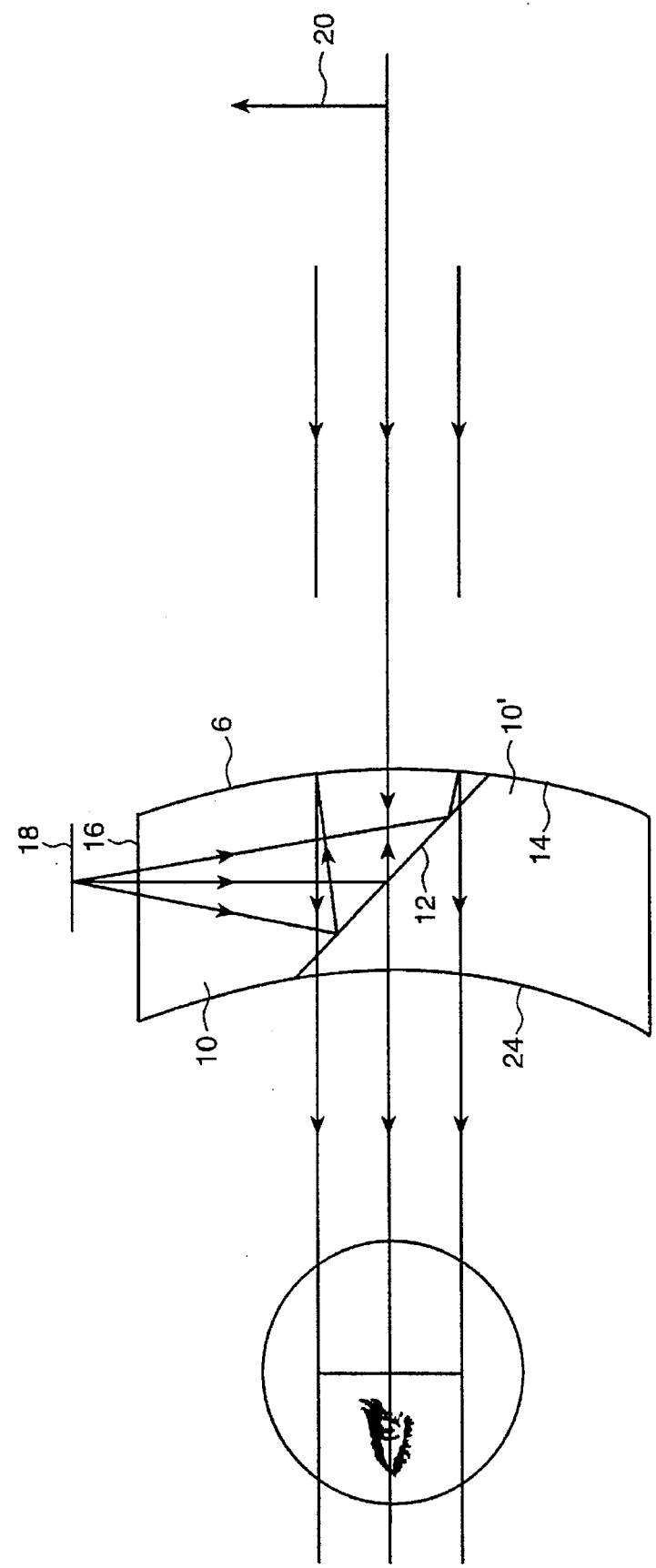
FIG. 2 is a side view of another embodiment having zero optical power.

Another embodiment is illustrated in FIG. 2, which differs from the embodiment of FIG. 1 only in that surface 24, facing the eye of the observer, is also a concave one. Due to the fact that both surfaces 24 and 6 are curved ones, the optical power of this lens is zero, if their curvatures and index of reflection are chosen correctly, as is per se known.

This and the subsequent embodiments are meant to be used in situations in which the object 20 is located at optical infinity, i.e., where the light rays emerging from it can be considered as parallel. Given the fact that the display surface 18 is located at the focal plane of spherical mirror 6' and that the rays from the data image will therefore emerge from lens 2 as parallel rays, the relaxed eye will perceive the light rays from the data image and from object 20 as if coming from infinity, i.e., the eye will see both the data image and object 20 with equal sharpness.

Figure 3:
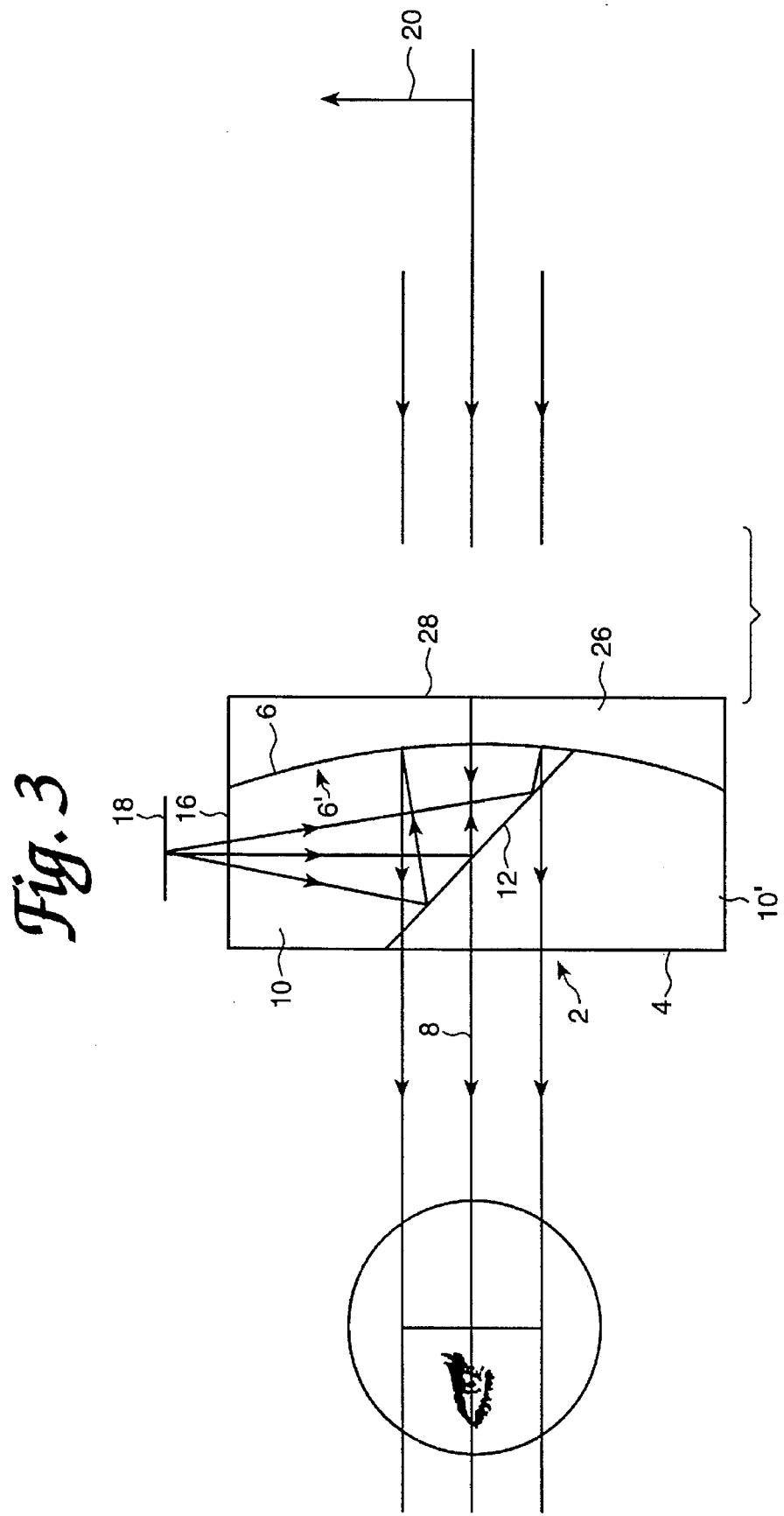
FIG. 3 illustrates another zero-power embodiment in the form of a doublet.

FIG. 3 is a side view, in schematic cross-section, of another embodiment of the present invention. This embodiment is made, as are all others, of a transparent material such as glass or acrylic polymer and has the form of a doublet with zero optical power. This doublet comprises two lenses: a positive lens such as lens 2 of FIG. 1, i.e., a plano-convex one, and a negative lens 26, such as a plano-convex lens. The positive lens 2, as in FIG. 1, is made up of two parts 10 and 10', with an inclined beam splitter 12 between them.

The negative lens 26 of the doublet has a radius of curvature identical with the radius of curvature of positive lens 2 and is cemented to surface 6. Surface 6 is provided with a partially reflective coating, such as a dichroic or holographic one, and serves as collimating mirror 6'. Optically, as far as the viewer is concerned, the embodiment of FIG. 3 functions exactly as explained above in conjunction with the embodiment of FIG. 2.

Figure 4:
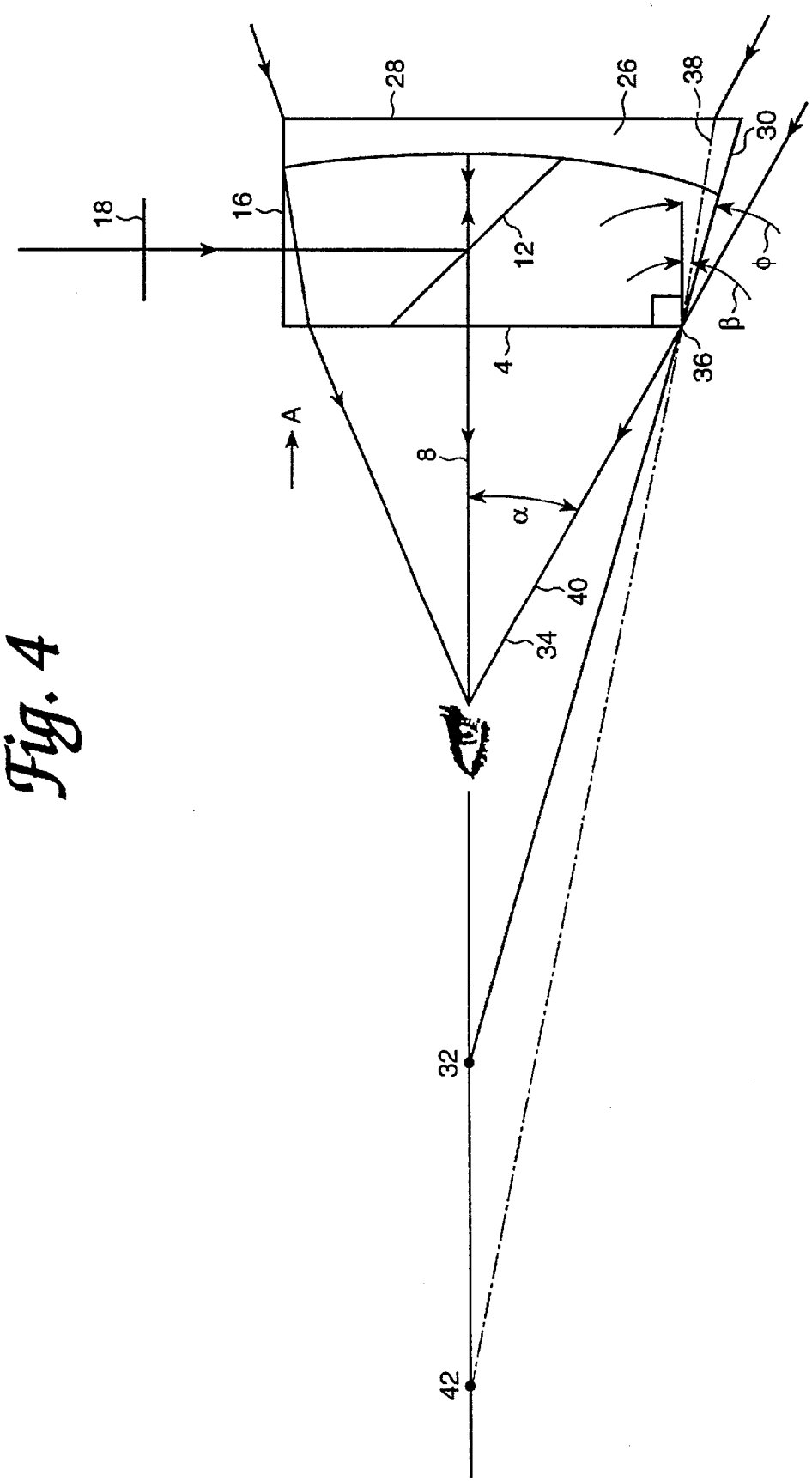
FIG. 4 represents a preferred embodiment of the invention in which the lens edge is part of the surface of a cone.
Figure 5:
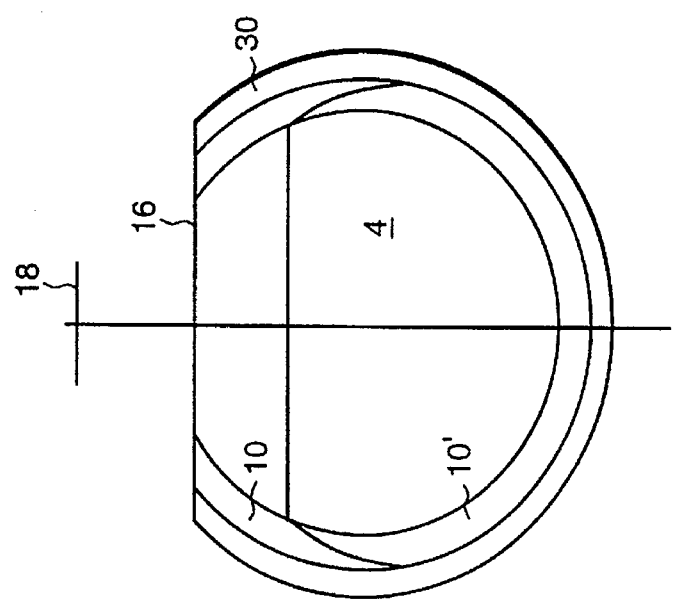
FIG. 5 is a view of the embodiment of FIG. 4, in the direction of arrow A in FIG. 4.

FIGS. 4 and 5 illustrate the exterior shape given to the optical body of the invention, so as to minimize obstruction of part of the outside view when looking through it. Any obstruction in the vicinity of the eye will block out a substantial part of the view.

In order to minimize such obstructions, the originally cylindrical lens edge is made to form part of the surface of a cone, the base of which faces object 20 and the imaginary apex 32 of which is located beyond the center of curvature of mirror 6'.

With reference to FIG. 4, ray 34, assumed to originate in the viewer's eye in the direction of the lower corner 36 of the optical body, makes an angle α with the optical axis 8 of the system. This ray is refracted in the transparent body according to Snell's Law, and makes an angle β with the optical axis 8 and exits the lens body as ray 38, parallel to ray 34. A further ray, assumed to come from the viewer's eye in a direction nearly parallel to ray 34, passes very close to the lower corner 36 but is not refracted and continues in a straight direction without any impediment. The angle φ of cut of the cone is

β<φ<α where the optimum shape is obtained by a cut at an angle of

φ=β/2+α/2.

Rays 38 refracted near the front edge of lens 26 form a cone with an imaginary apex 42.

FIG. 5 is a view, in the direction of arrow A in FIG. 4, of the embodiment of FIG. 4.

Figure 6:
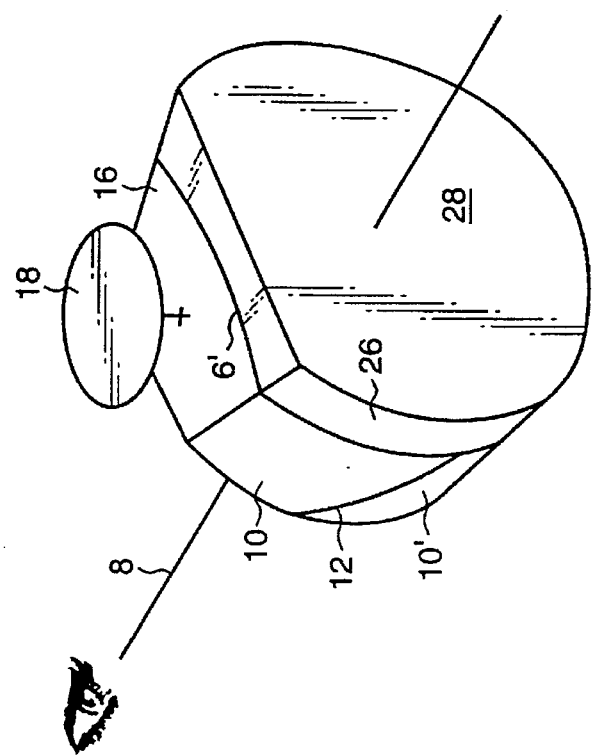
FIG. 6 is a perspective view of the embodiment of FIG. 5.

FIG. 6 is a perspective view of the embodiment of FIG. 4, where 18 is the image surface, as located in the focal plane of the mirror 6'.

Yet another embodiment is illustrated in FIG. 7, where 2 is a positive lens with curved, partially reflecting mirror surface 6', the convex side of which faces the object 20. To the plane surface 4 of the lens, there is cemented a plano-concave lens 26 of negative power, with the concave surface 24 facing the viewer. The other elements, such as surface 16 and beam splitter 12, are the same as in FIG. 2. The resulting optical power of this lens doublet is zero.

FIG. 8 illustrates an embodiment of the invention in which the plane surface 16 facing the data generator display surface includes, with the optical axis 8, an acute angle δ. However, an embodiment is also envisaged that includes, with axis 8, an obtuse angle.

While the curved surfaces described above were spherical, it should be understood that they could be of different geometries, such as conic, toric, or others.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An integrated optical system for the simultaneous viewing of a first object and an image of a second object superposed on said first object, comprising:

a lens having an optical axis and including a first surface facing a viewer and a second, curved surface facing said first surface and constituting a partially reflecting mirror, said lens being divided into two parts by a planar third surface defined by an interface constituting a semitransparent mirror which slantingly transverses said lens from said first surface towards said second surface; and a fourth surface intersecting said first and second surfaces, produced by truncating said lens, said fourth surface facing said image of said second object;

relative positions between said semitransparent mirror, said second surface, said second object and the optical axis of said lens being such that a light beam originating in said image passes said fourth surface and is intercepted by said semitransparent mirror, which reflects it onto said second surface that, acting as a collimating mirror, reflects said beam via said first surface towards a viewer in a direction substantially parallel to said optical axis;

wherein said first surface is concave with a radius of curvature substantially equal to a radius of curvature of said second, curved surface.

2. The system as claimed in claim 1, wherein said second surface is convex and the partially reflecting mirror constituted by it is concave.

3. The system as claimed in claim 1, further comprising a plano-concave lens with a radius of curvature substantially equalling a radius of curvature of said second, curved surface and cemented, with its concave surface, to said second surface.

4. The system as claimed in claim 1, wherein said semitransparent mirror traverses said lens from a region on said first surface close to said fourth surface to a region on said second surface remote from said fourth surface.

5. The system as claimed in claim 1, wherein each of said first surface and said second, curved surface is selected from the group including spherical, conic and toric surfaces.

6. An integrated optical system for the simultaneous viewing of a first object and an image of a second object superposed on said first object, comprising:

- a lens having an optical axis and including a first surface facing a viewer and a second, curved surface facing said first surface and constituting a partially reflecting mirror, said lens being divided into two parts by a planar third surface defined by an interface constituting a semitransparent mirror which slantingly traverses said lens from said first surface towards said second surface; and
- a fourth surface intersecting said first and second surfaces, produced by truncating said lens, said fourth surface facing said image of said second object;
- relative positions between said semitransparent mirror, said second surface, said second object and the optical axis of said lens being such that a light beam originating in said image passes said fourth surface and is intercepted by said semitransparent mirror, which reflects it onto said second surface that, acting as a collimating mirror, reflects said beam via said first surface towards a viewer in a direction substantially parallel to said optical axis;
- wherein, apart from said fourth surface, an edge of said lens defines a portion of a surface of a cone, with its base facing said first object and its imaginary apex being located beyond a viewer's eye.

7. The system as claimed in claim 6, wherein said fourth surface includes, with said optical axis, an angle of between 0° and 30°.

8. An integrated optical system for the simultaneous viewing of a first object and an image of a second object superposed on said first object, comprising:

- a lens having an optical axis and including a first surface facing a viewer and a second, curved surface facing said first surface and constituting a partially reflecting mirror, said lens being divided into two parts by a planar third surface defined by an interface constituting a semitransparent mirror which slantingly traverses said lens from said first surface towards said second surface;
- a fourth surface intersecting said first and second surfaces, produced by truncating said lens, said fourth surface facing said image of said second object;
- relative positions between said semitransparent mirror, said second surface, said second object and the optical axis of said lens being such that a light beam originating in said image passes said fourth surface and is intercepted by said semitransparent mirror, which reflects it onto said second surface that, acting as a collimating mirror, reflects said beam via said first surface towards a viewer in a direction substantially parallel to said optical axis; and
- a plano-concave lens with a radius of curvature substantially equalling a radius of curvature of said second, curved surface and cemented, with its plane surface, to said first surface.

\* \* \* \* \*